United States Patent
DeLuca et al.

(10) Patent No.: US 11,301,245 B2
(45) Date of Patent: Apr. 12, 2022

(54) DETECTING BIAS IN ARTIFICIAL INTELLIGENCE SOFTWARE BY ANALYSIS OF SOURCE CODE CONTRIBUTIONS

(71) Applicant: International Business Machines Corporation, Armonk, NY (US)

(72) Inventors: Lisa Seacat DeLuca, Baltimore, MD (US); Kelley Anders, East New Market, MD (US); Zachary A. Silverstein, Jacksonville, FL (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/857,694

(22) Filed: Apr. 24, 2020

(65) Prior Publication Data
US 2021/0334096 A1 Oct. 28, 2021

(51) Int. Cl.
*G06F 9/44* (2018.01)
*G06F 8/75* (2018.01)
*G06F 11/36* (2006.01)

(52) U.S. Cl.
CPC .............. *G06F 8/75* (2013.01); *G06F 11/368* (2013.01)

(58) Field of Classification Search
None
See application file for complete search history.

(56) References Cited

U.S. PATENT DOCUMENTS

| | | | |
|---|---|---|---|
| 2002/0073398 A1* | 6/2002 | Tinker | G06F 8/65 717/110 |
| 2016/0179501 A1* | 6/2016 | Briggs | G06F 8/71 717/120 |
| 2017/0330058 A1* | 11/2017 | Silberman | G06N 5/025 |
| 2018/0189732 A1 | 7/2018 | Kozloski et al. | |
| 2018/0357557 A1* | 12/2018 | Williams | G06Q 30/0201 |
| 2019/0066056 A1 | 2/2019 | Gomez et al. | |
| 2019/0129714 A1* | 5/2019 | Wright | G06F 8/75 |
| 2019/0147371 A1 | 5/2019 | Deo et al. | |

FOREIGN PATENT DOCUMENTS

AU    2018101100 A4    9/2018

OTHER PUBLICATIONS

IP.com, "System and method to detect most unbiased model version", Jan. 2019 (Year: 2019).*

(Continued)

*Primary Examiner* — Wei Y Zhen
*Assistant Examiner* — Lanny N Ung
(74) *Attorney, Agent, or Firm* — Edell, Shapiro & Finnan, LLC

(57) ABSTRACT

Techniques are provided for determining bias in an artificial intelligence/machine learning system. A plurality of users contributing to content of the source code base are identified. A plurality of user contributions are generated by determining each user contribution to the source code base by analyzing attributes of the content. The plurality of user contributions are mapped to respective profiles of the users. A determination is made as to whether categories of contribution defined for the source code base are met, based upon the mapping of the plurality of user contributions to respective profiles.

20 Claims, 5 Drawing Sheets

(56) References Cited

OTHER PUBLICATIONS

Gayna Williams, "Are you sure your software is gender-neutral?", 2014 (Year: 2014).*
Amiangshu Bosu et al., "Diversity and Inclusion in Open Source Software (OSS) Projects: Where Do We Stand?", Oct. 2019 (Year: 2019).*
Jahna Otterbacher et al., "Is the Crowd Biased? Understanding Binary Value Judgements on User-Contributed Content", Feb. 2012 (Year: 2012).*
Renuka Sindhgatta, "Identifying Domain Expertise of Developers from Source Code", Aug. 2008 (Year: 2008).*
B. Vasilescu, et al., "A Data Set for Social Diversity Studies of GitHub Teams," 2015 IEEE/ACM 12th Working Conference on Mining Software Repositories, May 16-17, 2015, Florence, Italy, pp. 514-517, 4 pages.
A. Bosu and K. Sultana, "Diversity and Inclusion in Open Source Software (OSS) Projects: Where Do We Stand?", In Proceedings of the 13th ACM/IEEE International Symposium on Empirical Software Engineering and Measurement (ESEM '19), Porto de Galinhas, Brazil, Sep. 19-20, 2019, 11 pages.
M. Abuhamad et al., "Large-Scale and Language-Oblivious Code Authorship Identification." In Proceedings of the 2018 ACM SIGSAC Conference on Computerand Communications Security (CCS '18). ACM, Oct. 15-19, 2018, 14 pages.
M. Abuhamad et al., "Code authorship identification using convolutional neural networks," Future Generation Computer Systems, vol. 95, pp. 104-115, Jun. 2019, 12 pages.
Anonymous, "System and method to detect most unbiased model version." IP.com Disclosure No. IPCOM000256871D, Publication Date: Jan. 7, 2019, 4 pages.
J. Dastin, "Amazon scraps secret AI recruiting tool that showed bias against women", Technology News, Oct. 9, 2018, (accessed at https://www.reuters.eom/article/us-amazon-com-jobs-automation-insight-idUSKCN1MK08Ghttps://www.reuters.com/article/us-amazon-com-jobs-automation-insight-idUSKCN1MK08G), 7 pages.
Wikipedia, Algorithmic Bias, last edited on Apr. 20, 2020 (accessed online on Apr. 24, 2020 at https://en.wikipedia.org/wiki/Algorithmic_bias), 13 pages.
Julie Teigland, Why we need to solve the issue of gender bias before AI makes it worse, EY, 2019, (accessed online on Apr. 24, 2020 at https://www.ey.com/en_us/wef/why-we-need-to-solve-the-issue-of-gender-bias-before-ai-makes-it), 2 pages.
Alexandra George, Thwarting Bias in AI systems, Carnegie Mellon University, 2019 (Accessed online on Apr. 24, 2020 at https://www.ece.cmu.edu/news-and-events/story/2019/02/thwarting-bias-in-ai-systems.html, 2019), 3 pages.
Annie Palmer, The world's first genderless AI voice: Researchers launch neutral-sounding 'Q' that's neither male nor female to fight bias in smart assistants, Daily Mail, 2019 (accessed online on Apr. 24, 2020 at https://www.dailymail.co.uk/sciencetech/article6796065/Genderneutralvoiceassistantdevelopedcombatgenderbiasartificialintelligence.html), 5 pages.
Will Byrne, Now Is The Time To Act To End Bias In AI, Fast Company (2018) (accessed online on Apr. 24, 2020 at https://www.fastcompany.com/40536485/now-is-the-time-to-act to-stop-bias-in-ai), 5 pages.
Larry Dignan, IBM launches tools to detect AI fairness, bias and open sources some code, ZDNet, 2018 (accessed online on Apr. 24, 2020 at https://www.zdnet.com/article/ibmlaunchestoolstodetectaifairnessbiasandopensourcessomecode/), 6 pages.
IBM, IBM developer, IBM Open Project: AI Fairness 360 The AI Fairness toolkit (published Nov. 14, 2018 and updated Mar. 9, 2020) (accessed online on Apr. 24, 2020 at https://developer.ibm.com/open/projects/ai-fairness-360/), 2 pages.
IBM, AI Fairness 360 (AIF360), last commit Apr. 3, 2020, (accessed online on Apr. 24, 2020 at https://github.com/IBM/AIF360), 5 pages.
Jodie Wallis, Is Artificial Intelligence Sexist?, The Globe and Mail, 2018 (accessed online on Apr. 24, 2020 at https://www.theglobeandmail.com/business/careers/leadership/article-is-artificial-intelligence-sexist/), 4 pages.
Noel Sharkey, The impact of gender and race bias in AI, Humanitarian Law and Policy, ICRC, 2018 (accessed online on Apr. 24, 2020 at https://blogs.icrc.org/law-and-policy/2018/08/28/impact-gender-race-bias-ai/), 8 pages.
Abhijeet Katte, Strong AI? Industry Majors are Reeling from Gender Bias in AI Tools, Analytics India Magazine, 2018, (accessed online on Apr. 24, 2020 at https://analyticsindiamag.com/strong-ai-industry-majors-are-reeling-from-gender-bias-in-ai-tools/), 2 pages.
Associated Press, Gender bias claims roil AI research community, New York Post, 2018 (accessed online on Apr. 24, 2020 at https://nypost.com/2018/12/13/gender-bias-claims-roil-ai-research-community/), 3 pages.
Bettina Buchel, Artificial Intelligence could reinforce society's gender inequality problems, The Conversation, 2018 (accessed online on Apr. 24, 2020 at https://theconversation.com/artificial-intelligence-could-reinforce-societys-gender-equality-problems-92631), 3 pages.
Bass et al., Researchers Combat Gender and Racial Bias in Artificial Intelligence, Bloomberg Technology, 2017 (accessed online on Apr. 24, 2020 at https://www.bloomberg.com/news/articles/2017-12-04/researchers-combat-gender-and-racial-bias-in-artificial-intelligence), Summary 1 page.
Reuters, Amazon ditched AI recruiting tool that favored men for technical jobs, The Guardian (2018) (accessed online on Apr. 24, 2020 at https://www.theguardian.com/technology/2018/oct/10/amazon-hiring-ai-gender-bias-recruiting-engine), 4 pages.

* cited by examiner

DETECTING BIAS IN ARTIFICIAL INTELLIGENCE SOFTWARE BY ANALYSIS OF SOURCE CODE CONTRIBUTIONS

TECHNICAL FIELD

Present invention embodiments relate to detecting bias in artificial intelligence systems, and in particular, to detecting bias in artificial intelligence systems by analyzing source code contributions.

DISCUSSION OF THE RELATED ART

As artificial intelligence programs have become more advanced, such programs have become integrated into aspects of modern life. If the data used to train an artificial intelligence or machine learning system is biased, then the system itself will be biased as well. When bias in an artificial intelligence or machine learning system has been detected, the system is often recalled. While bias in training data is recognized, other sources of bias in artificial intelligence or machine learning systems may be present.

SUMMARY

According to embodiments of the present invention, methods, systems, and computer readable media are provided for evaluating source code base for potential bias. A plurality of users contributing to content of the source code base are identified. A plurality of user contributions are generated by determining each user contribution to the source code base by analyzing attributes of the content. The plurality of user contributions are mapped to respective profiles of the users. A determination is made as to whether categories of contribution defined for the source code base are met, based upon the mapping of the plurality of user contributions to respective profiles.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components.

DETAILED DESCRIPTION

In an effort to identify sources of bias in artificial intelligence (AI) or machine learning (ML) systems, present techniques analyze the source code base and profiles of source code base contributors to determine whether the source code base as a whole meets predetermined criteria (e.g., categories of contributions).

Algorithmic bias may occur when the underlying source code contains implicit biases from its source code developers that translate into biased decisions. Bias can emerge due to many factors including, but not limited to, the design of the AI/ML model reflecting the manner in which source code is developed, the manner in which data is collected and selected to train the AI model, as well as from unintended or unanticipated decisions by the AI model.

Algorithmic bias is found across platforms including, but not limited to, search engine results, image analysis, job screening systems, and social media platforms. Algorithmic bias may have numerous impacts ranging from inadvertent privacy violations or reinforcement of social biases.

Accordingly, present techniques detect potential AI/ML source code bias based on profile and statistical information gathered during source code change set delivery. When a potential bias is detected, present techniques notify developers and project managers as well as other personnel of the detection of the potential bias for further investigation and remediation. Potential sources of bias may be identified and remediated during development and prior to release of the product. In some aspects, the composition of the development and project team may be adjusted (e.g., by including additional developers and project managers, etc. with suitable profile factors). In other aspects, the source code may be automatically adjusted (e.g., portions of source code with potential bias may be flagged for review) and the source code may be recompiled without flagged sections and released. Remediated flagged sections may be included in future releases.

Figure 1A:
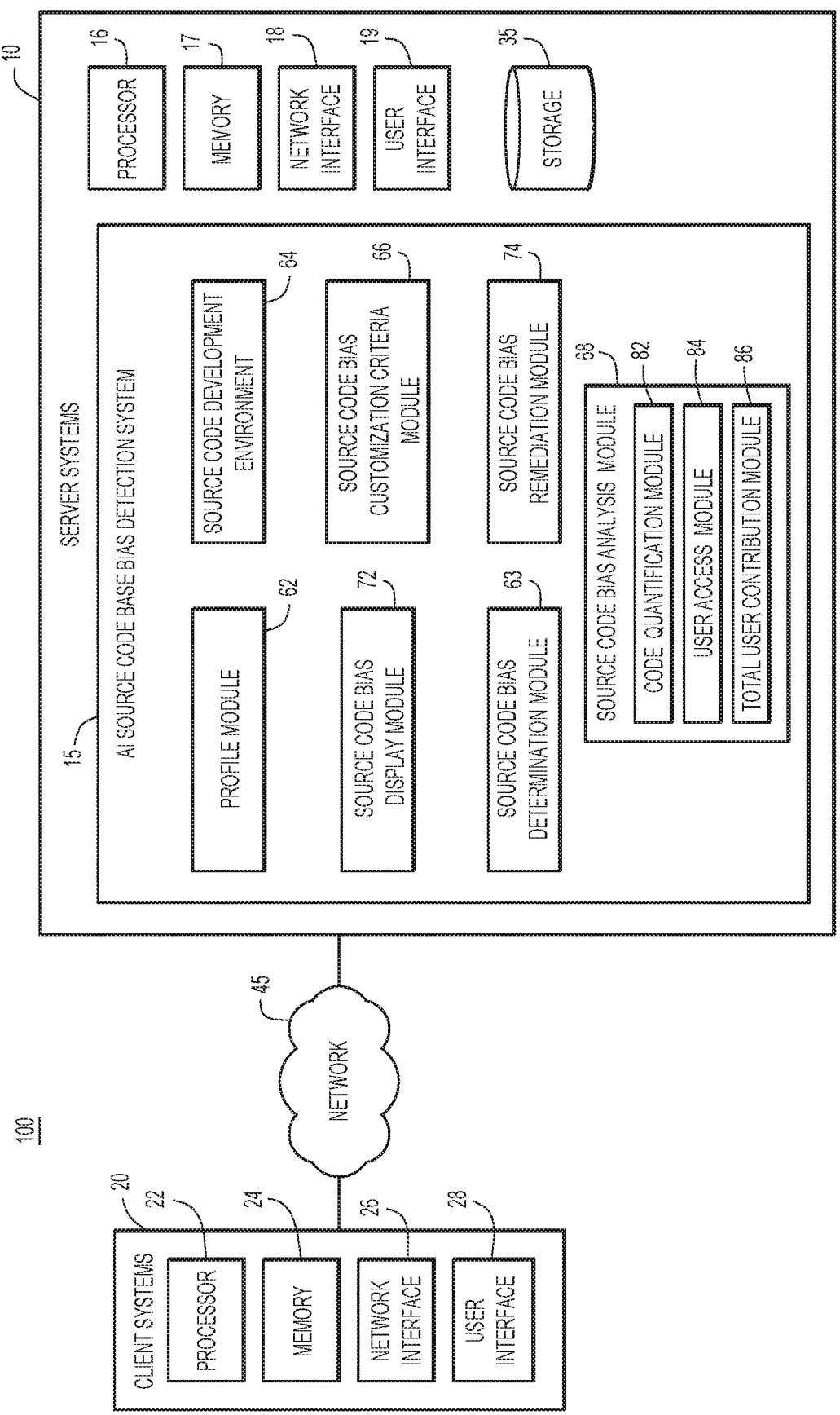
FIG. 1A is a diagrammatic illustration of an example computing environment for an artificial intelligence source code base bias detection system, according to an embodiment of the present invention.

An example environment for use with present invention embodiments is illustrated in FIG. 1A. Specifically, environment 100 includes one or more server systems 10, one or more client or end-user systems 20 and a network 45. Server systems 10 and client systems 20 may be remote from each other and may communicate over network 45. The network may be implemented by any number of any suitable communications media, such as a wide area network (WAN), a local area network (LAN), Internet, Intranet, etc. Alternatively, server systems 10 and client systems 20, may be local to each other, and may communicate via any appropriate local communication medium, such as local area network (LAN), hardwire, wireless link, Intranet, etc.

Client systems 20 enable users to provide information (e.g., source code contributions, etc.) to server systems 10 and to obtain results of the analysis from server systems 10.

Server systems 10 may comprise a storage database 35 that may store various types of information (e.g., source code base contributions, source code contributor profiles, source code customization criteria, results of source code analysis, etc.) for the analysis. Storage 35 may include any suitable information in a structured, semi-structured, or unstructured format. For large volumes of code, platforms for the distributed processing of large data sets across clusters of computers (e.g., Hadoop, etc.) may be utilized along with structured query language interfaces for distributed processing environments (e.g., BigSQL, etc.).

Storage database 35 may be implemented by any conventional or other database or storage unit, may be local to or remote from server systems 10 and client systems 20 and may communicate via any appropriate communication medium, such as local area network (LAN), wide area network (WAN), Internet, hardware, wireless link, Intranet, etc. The client systems may present a graphical user interface, such as a GUI, etc., or other interface, such as command line prompts, menu screens, etc., to solicit source code from users, and to detect potential bias in the source code base.

Server systems 10 and client systems 20 may be implemented by any conventional or other computer systems preferably equipped with a display or monitor, a base (including at least one hardware processor (e.g., microprocessor, controller, central processing unit (CPU), etc.), one or more memories and/or internal or external network interfaces or communications devices (e.g., modem, network cards, etc.), optional input devices (e.g., a keyboard, mouse or other input device), and any commercially available and custom software (e.g., server/communications software, artificial intelligence source code bias detection system, browser/interface software, etc.). By way of example, the server/client includes at least one processor 16, 22, one or more memories 17, 24 and/or internal or external network interfaces or communications devices 18, 26 such as a modem or network cards, and a user interface 19, 28 etc. The optional input devices may include a keyboard, mouse, or other input device. The client system may be any suitable device, including but not limited to desktops, laptops, tablets, etc. or any other device capable of serving as an interface to a programming environment for development of source code. The source code may be linked to user information, e.g., through a user profile, etc. User refers to any individual using and/or contributing to the source code base during any stage of the process beginning at inception, through development and testing, product release, and end-use.

Alternatively, one or more client systems 20 may perform the operations of servers systems 10 in a stand-alone mode of operation. For example, the client system may store or have access to artificial intelligence source code base bias detection system 15. The graphical user or other interfaces 19, 28, such as a GUI, command line prompts, menu screens, etc., solicits source code from users, and reports results from the analysis.

Artificial intelligence source code base bias detection system 15 may include one or more modules or units to perform the various functions of present invention embodiments described herein. The various modules (e.g., artificial intelligence source code base bias detection system 15, comprising profile module 62, source code bias determination module 63, source code development environment 64, source code bias customization criteria module 66, source code bias analysis module 68, source code bias display module 72, source code bias remediation module 74, etc.), may be implemented by any combination of any quantity of software and/or hardware modules or units, and may reside within memory 17 of the server for execution by processor 16. These modules are described in additional detail below.

Profile module 62 accesses or obtains information for each user. A user may include any individual (e.g., project manager, offering manager, technical writer, developer, tester, support engineer, etc.) with any contribution to the source code base at any stage (e.g., inception, development, testing, production, release, etc. of the AI/ML system). Profile information may include but is not limited to geographic location, subject matter expertise, experience, or any other feature or demographic information (e.g., gender, ethnicity, age, religion, sexual orientation, etc.) corresponding to a user.

Source code development environment 64 includes an environment for developing and managing source code as well as training and testing the AI/ML system. This environment contains the ability to track user metrics to determined user contribution based on various factors, including but not limited to, amount of code contributed, revision history of documents, document and folder access, user authentication, amount of time logged in to the source code development environment, amount of time training and testing the AI system in the source code development environment, etc.

Source code bias customization criteria module 66 includes rules and/or other metrics pertaining to desired categories of contribution for the source code base of the AWL system. For example, the categories of contribution may include percentages of contribution by users with specified factors (e.g., from the user profile, etc.). For example, categories of contribution may specify various metrics for the source code base (e.g., at least 25% of code contributed by a female, at least a 15% contribution by a user age 45 or older, at least a 10% contribution from a user with a specific technical background, etc.).

Examples of additional categories of contribution include contributions based upon stage of product development (e.g., inception, development, training/testing, production, release, etc.) or user role. If it is determined that the categories of contribution in source code bias customization criteria module 66 are not met, the AI/ML system may be flagged as potentially biased, and actions may be triggered by source code bias remediation module 74 for remediation of this failure.

Source code bias analysis module 68 analyzes the source code contributions to quantify the contribution from each user, and includes code quantification module 82, user access module 84 and total user contribution module 86. In some aspects, source code bias analysis module 68 determines an amount of source code contributed by a user, user access to documents (e.g., based on time editing or reviewing documents, etc.), or other factors, in order to generate metrics, such as a percentage contribution for each user, for the categories of contribution.

Code quantification module 82 determines an amount of code contributed by a user (e.g., based on various attributes such as submission of modules, revisions to source code, lines of source code, number of functions, etc.). For example, code quantification module 82 may determine how many lines of code a user has contributed or edited by reviewing revision history of source code files to associate one or more users with each line of code. A line of code may be associated with a single user (e.g., the original author) or multiple users (e.g., the original authors and other users that subsequently edited the line of code). A similar analysis may be provided to determine a number of functions and/or modules contributed by users. Thus, this module quantifies the amount of code that a user has directly contributed.

User access module 84 quantifies an amount of code that a user has contributed indirectly. For example, a user may manage, review, test, or otherwise validate aspects of source code in a manner that does not lead directly to a source code change, and therefore, may not directly associate the user with specific lines of code. However, in this case, a contribution by the user has been made, and may be quantified based upon attributes such as an amount of time that particular source code files have been accessed, the number of times that particular source code files have been accessed, a number of test cases written by the user, a number of test cases performed by the user, etc. Contributions may be computed based on averages, means, etc., such as an average number of lines, functions, or modules that may be validated by a user per unit time. For example, in some cases, a user may be able to validate an average number of lines of code in a given amount of time.

Based upon this information, an indirect contribution may be quantified.

Total user percentage contribution module 86 may utilize results from code quantifications module 82 and user access module 84, to arrive at a total user percentage contribution per user.

Source code bias display module 72 aggregates user metrics corresponding to contributions for the development, training, testing, validation and/or release of the AI/ML system. This module may display the aggregated metrics and profile information that are mapped to categories of contribution, for example, in a tabular, spreadsheet, or other graphical display format. Accordingly, this display module allows visualization of the categories of contribution mapped to user contributions in view of profile information to determine whether the categories of contribution have been met.

Source code bias remediation module 74 may send out notification or alerts and/or may block production or release operations in response to customization criteria not being met based on source code contributions determined by source code bias analysis module 68 in view of user profiles from profile module 62.

Source code bias determination module 63 determines whether the categories of contribution and corresponding user contributions in view of user profile information for each category have been met. In aspects, source code bias determination module may obtain user profiles from profile module 62, categories of contribution from source code bias customization criteria module 66, and total user contribution from source code bias analysis module 68. Once obtaining relevant data, this module generates a mapping of this data and determines whether the categories of contribution have been met. An example is provided in FIG. 4 below.

Figure 1B:
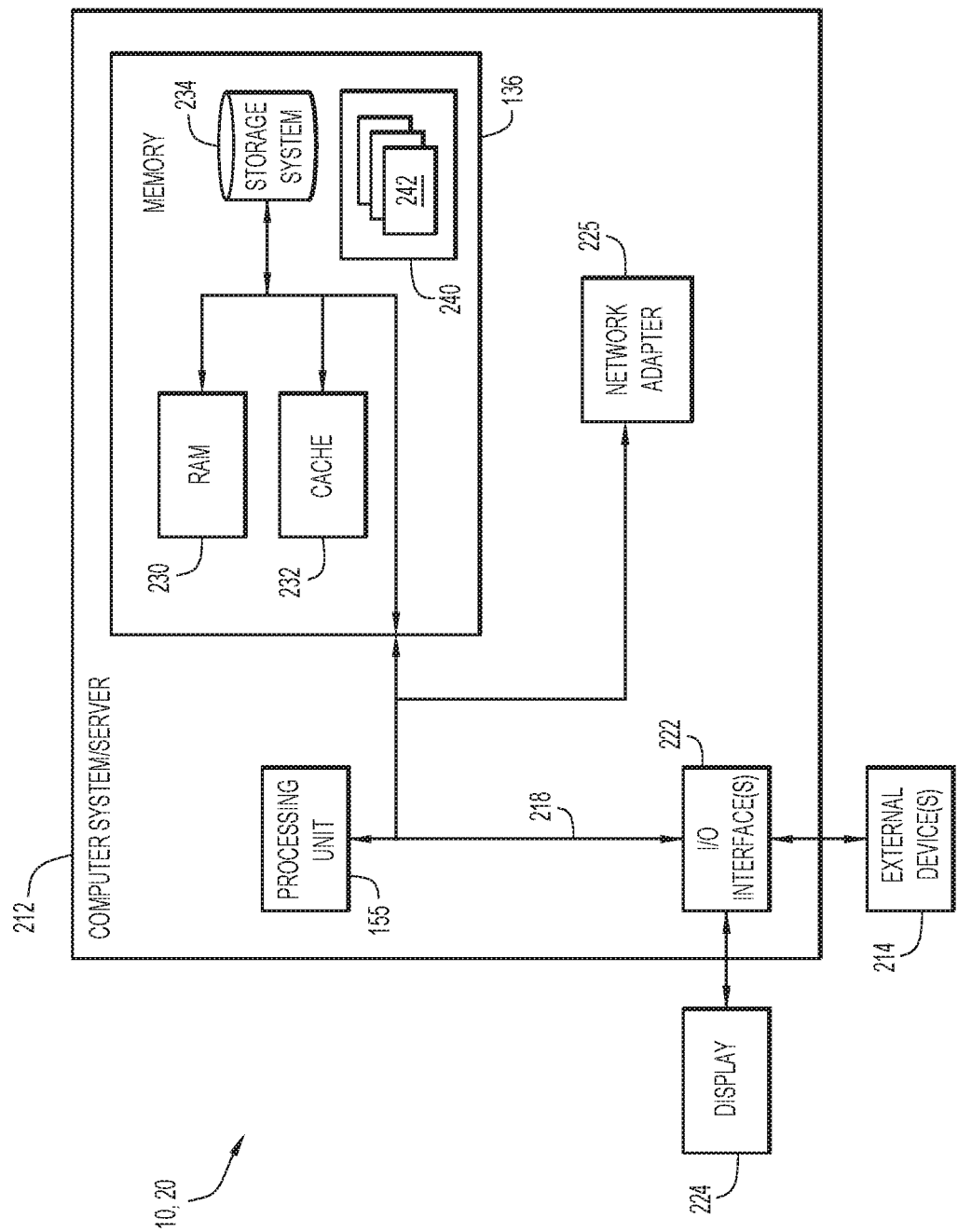
FIG. 1B is an example computing device for the computing environment of FIG. 1, according to an embodiment of the present invention.

Client systems 20 and server systems 10 may be implemented by any suitable computing device, such as computing device 212 shown in FIG. 1B for computing environment 100. This example is not intended to suggest any limitation as to the scope of use or functionality of embodiments of the invention described herein. Regardless, computing device 212 is capable of being implemented and/or performing any of the functionality set forth herein.

In the computing device, there is a computer system which is operational with numerous other general purpose or special purpose computing system environments or configurations. Examples of computing systems, environments, and/or configurations that may be suitable for use with the computer system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules (e.g., artificial intelligence source code base bias detection system 15 and its corresponding modules), being executed by a computer system. Generally, program modules may include routines, programs, objects, components, logic, data structures, and so on that perform particular tasks or implement particular abstract data types.

Computer system 212 is shown in the form of a general-purpose computing device. The components of computer system 212 may include, but are not limited to, one or more processors or processing units 155, a system memory 136, and a bus 218 that couples various system components including system memory 136 to processor 155.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 136 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 136 may include at least one program product having a set (e.g., at least one) of program modules that are configured to carry out the functions of embodiments of the invention.

Program/utility 240, having a set (at least one) of program modules 242 (e.g., artificial intelligence source code base bias detection system 15 and corresponding modules, etc.) may be stored in memory 136 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 225. As depicted, network adapter 225 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 2:
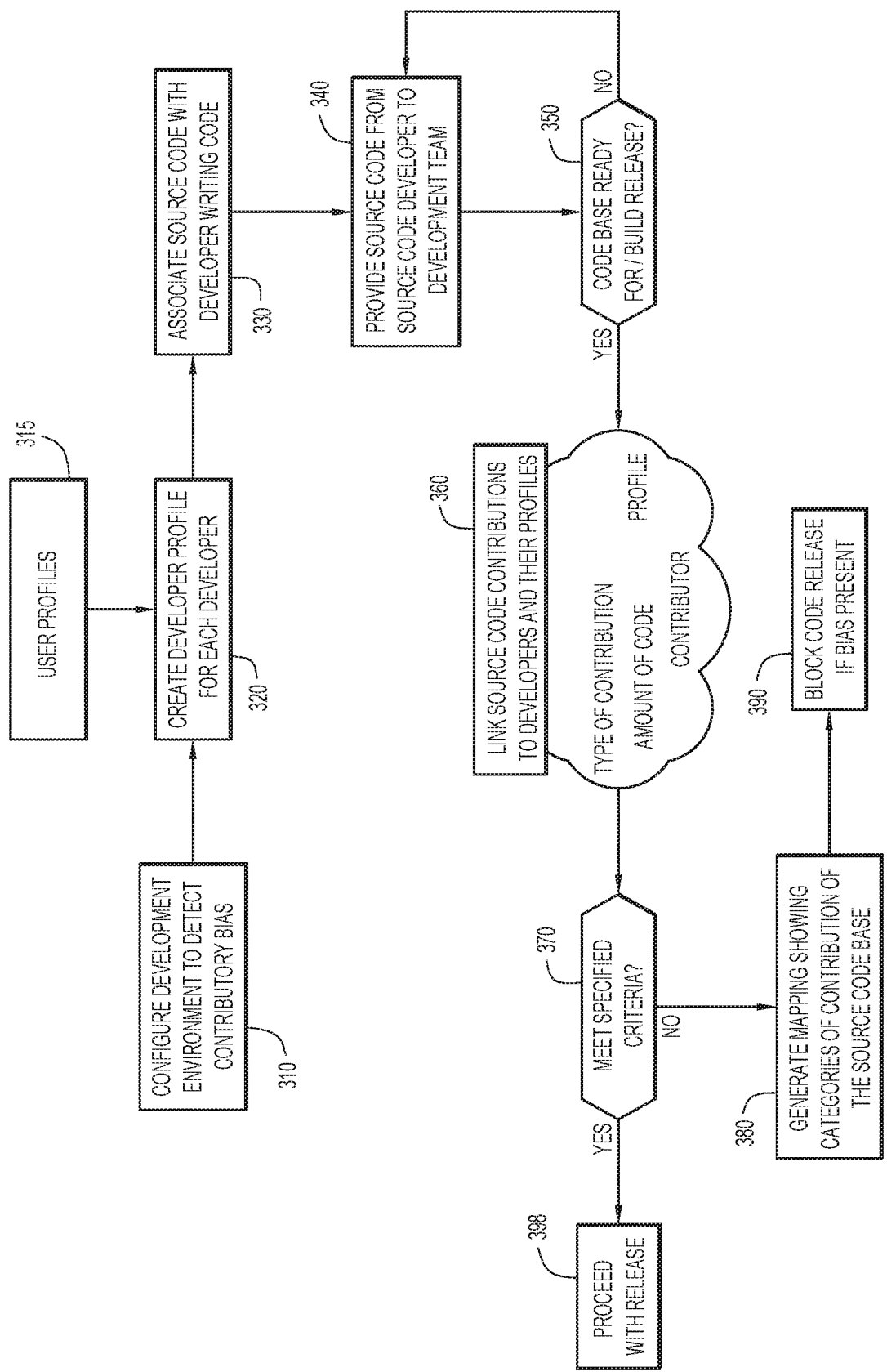
FIG. 2 is a flow diagram showing operations for detecting source code base bias, according to an embodiment of the present invention.

FIG. 2 is a flow diagram corresponding to an AI/ML source code bias base detection system 15 according to an embodiment of the present invention.

Profile information, accessed via profile module 62, may be assessed to evaluate bias including but not limited to factors within the profile.

In some aspects, the system may be customized (e.g., include categories of contributions) to detect bias based on the application being developed. For example, for source code base analysis, applications developed for a specific group of individuals may include one or more rules (e.g., categories of contribution) specifying contributions from users having attributes corresponding to that group. As an example, applications geared towards users with a specific technical background should be evaluated for source code base contributions from users with subject matter expertise in that technical background.

At operation 310, the source code development environment 64 is configured to detect contributory bias from users. In some aspects, the development environment is configured to implement version control for documents corresponding to source code development for an application, thereby allowing source code contributions during the development and testing process to be tracked. Version control allows a change set history of a document to be captured. For example, a source code developer may generate an initial version of a source code document, and the version control software associates that source code document with the source code developer, an identification number specific to that document, and a version number indicating a number of revisions of the document. As the source code document is modified, the version number is incremented. In some aspects, the system may access the most recent version and one or more previous versions in order to analyze source code base contributions.

In aspects, the development environment is associated with a project name, and source code developers are associated with project name. This allows developers to be linked to specific projects so that only developers that have been assigned to the project are considered in the analysis (instead of all developers within a company, institution, etc.). Present techniques are suitable for any software development environment, including but not limited to Jira, GitHub, BeanStack, SourceForge, etc.

At operation 320, a profile is created for each user associated with the project (e.g., a source code developer assigned to a project to develop source code, a data scientist tasked with obtaining and curating data to train AI models, a software tester to test the trained AI model, a project manager to coordinate development of the project, etc.). User profiles include information that may be used to ascertain whether bias is present, including but not limited to factors or attributes within the profile. A user may include any individual associated with the AI/ML, system development lifecycle, including but not limited to programming, training, building, and testing, validation, etc.

In some aspects, operating system programs or user access/login programs (e.g., Active Directory, etc.) may store information that may be accessed to generate a user profile. Thus, the user profile may be generated based upon information provided by users, information obtained from the operating system, user access software associated with the user, or a combination thereof. Accordingly, user profiles may be manually generated, automated, or a hybrid of both approaches.

At operation 330, source code is associated with the user writing the source code. Thus, operation 310 is directed towards setting up the environment for source code tracking, and operation 330 implements source code tracking for the user, linking content such as lines of code to particular users.

In a revision control environment, a first version of a document developed by a user may be associated with a revision control version (e.g., version 1.0). If the document is later accessed and edited, the edited version may be associated with a later revision control number (e.g., version 1.2). This may be extended to any number of versions of the document.

At operation 340, the source code document is considered to be complete, for example, in terms of intended functionality and the document is committed, for example, using change set delivery. Once this is completed, the document is available and accessible to the team. This version may be integrated with other documents from other developers to form the source code base.

At operation 350, the system determines whether the source code base is ready for build and/or release. If not, development continues at operation 340. Otherwise, at operation 360, the source code base is compiled/built, and source code is linked to particular developers and their associated profiles. The source code contribution by the user may be determined and linked to attributes of the users who committed that portion of the source code.

In aspects, an amount of code contributed by each user of the team may be determined based on attributes (e.g., number of lines of code, number of commits, number of functions edited, type of contribution (e.g., documentation, new variable introduction, new functions created), etc.) that may be determined and linked to the user profile.

The amount of source code may be quantified based on any suitable approach including direct contributions and indirect contributions. Direct contributions include contributions which may be determined based upon additions and edits to source code. These contributions may be determined based upon attributes indicating number of modules, numbers of functions, lines of code, change in (delta) for edited lines of code, etc. contributed by a user. Direct contributions for source code may include adding new functionality, fixing functionality, generating documentation, resolving troubleshooting and/or exception handling, or any other feature built into source code that is added or modified. A user identifier (part of revision control software in a developer environment) may be associated with each programming file, showing the original author of the file. A change history may be available for the file showing other users that have accessed and modified the file on a per line, per module and/or per function basis. The system may perform a document comparison between document revision versions to identify the number of lines, functions and/or modules that have been added or modified by users. For example, a first version of the file may indicate that a first user created the entire file. The second version of the file may indicate that a second user edited portions of the file. A third version of the file may indicate that a third user edited portions of the file, overlapping with portions edited by the second user. Thus, the source code analysis module parses the files to determine contributions from each user. From this information, a user's direct contribution in terms of the amount of source code may be determined.

In other aspects, user contribution may be indirect. For example, a user may spend hours verifying portions of code, in which case, significant portions of code may be reviewed and verified, with few additions or revisions. To capture this indirect metric, the system may consider attributes corresponding to contribution in terms of number of hours of verification based upon a length of time of file access, number of files accessed, frequency of file access, etc. These attributes may be quantified based on timestamps showing revision or viewing history of a user and a length of time a document was accessed by the user. The timestamps are tied to a user identifier or other identifier linking the file to a particular user.

For data scientists, a number of hours collecting and curating training data as well as training the AI/ML model may be determined. For AI/ML testing, the number of hours spent testing the AI/ML system may be determined.

In other aspects, categories of contribution include defined roles of the users, such as project manager, offering manager, technical writer, developer, tester, support engineer, etc. In some aspects, criteria may specify that at least one of each defined role is to contribute a predetermined percentage of effort.

The system may be fully customized in any suitable manner to meet any specified criteria pertaining to any category of contribution. The specific criteria may change from project to project.

At operation 370, the system determines whether the specified source code bias customized criteria (e.g., categories of contribution) have been met. For example, various thresholds or other defined criteria may be established. Thresholds may be used to determine source code contributions, including percentage contribution, etc. for various user groups. In some aspects, criteria may be used to mimic end-user usage and readership. For example, if a AI/ML system or application is directed towards a specific group, then the source code base contributions may be from users having the same or similar attributes as the group during creation and development of the software. For example, a category of contribution may indicate that a percentage of code (e.g., at least 20%) should be generated by users meeting criteria (e.g., 20% based on a first attribute associated with the group, 30% based on a second attribute associated with the group, etc.) for that application.

At operation 380, the system may determine that specific criteria have not been met, and may generate a mapping showing categories of contribution of the source code base. For example, the system may determine which categories of contribution are met (e.g., based upon thresholds, etc.) from user metrics/contributions and corresponding user profiles, which may be provided in a format for display via any suitable form, including a spreadsheet, table or graphic. At operation 390, the source code bias remediation module 74 may take any number of suitable actions including but not limited to alerting the individual compiling/building the code, alerting an administrator or team lead/project manager, sending a recommendation to individuals that fit the missing criteria to request evaluation of potential bias in the source code base, providing evidence for why the source code is flagged for potential AI bias, automatically modifying the source code to balance contributions with respect to the criteria. In aspects, release of the code base may be blocked from production deployment until bias review is complete. Alternatively, at operation 398, if all categories of contribution are met, validation and release of the source code base may proceed.

These techniques allow an organization to implement customized criteria based on membership of their development and product teams across their entire organization.

Figure 3:
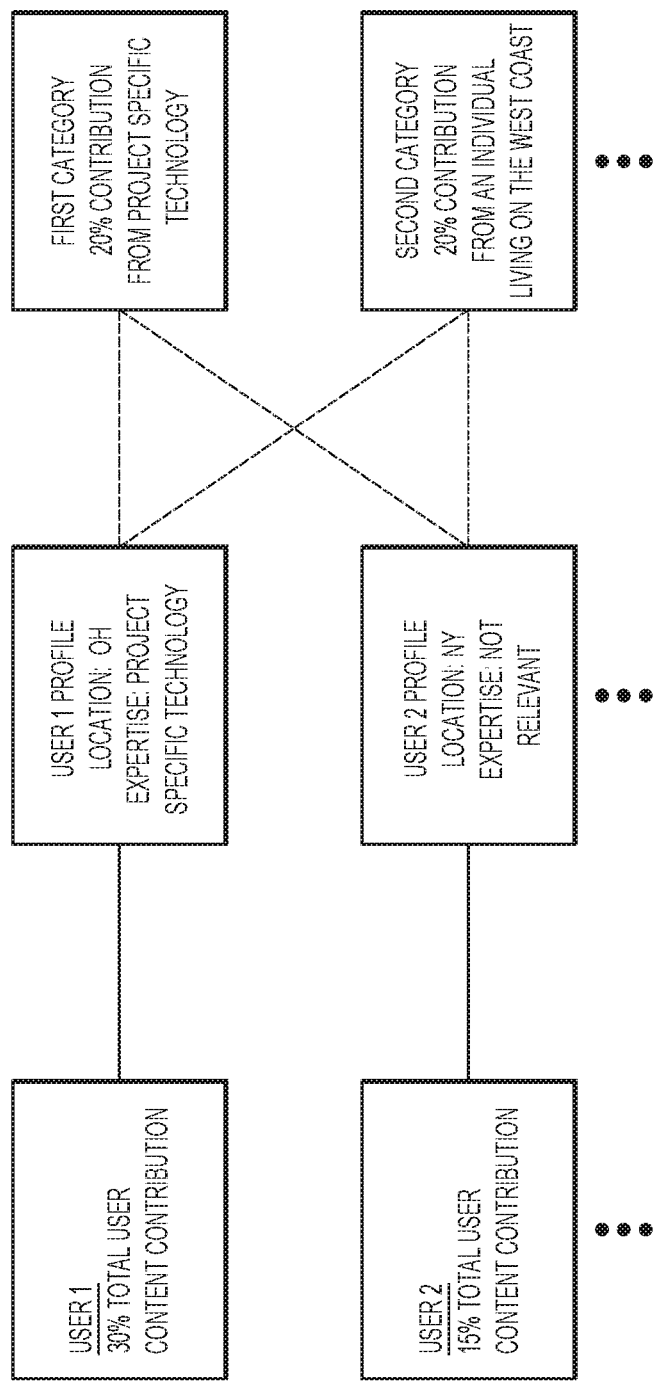
FIG. 3 shows an example mapping of user metrics to profiles to categories of contribution for detecting source code base bias, according to an embodiment of the present invention.

FIG. 3 shows an example mapping of user metrics to profiles to categories of contribution for detecting source code base bias, according to an embodiment of the present invention. In this example, profiles for users contributing to the source code base are provided and are accessed by profile module 62. As the source code base is developed, user contributions may be determined with source code bias analysis module 68. Customization criteria may be provided for the AI/ML system, indicating various categories of contribution that are to be met in order to produce a system that is bias free or with reduced bias.

Source code bias determination module 63 may map each user metric/contribution to the corresponding user profile. The corresponding user profile (in conjunction with user metrics) may be evaluated against various categories of contribution to determine which categories are met. If all categories of contribution are met, product verification and release continues as normal. If categories of contribution are not met, the system provides a notice or alert so that the bias may be evaluated and remediated.

In this example, source code bias determination module evaluates the user profile-user metric combinations against each category of contribution to determine if all specifications are met. In this example, all categories of contribution are not satisfied, as user 2 contributes 15% of content instead of the required 20% of content.

Figure 4:
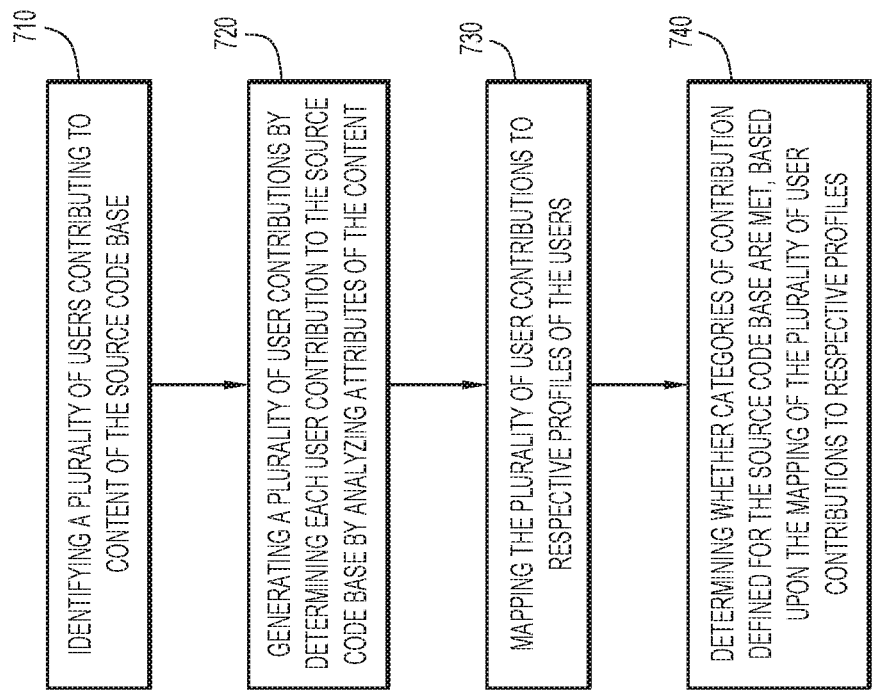
FIG. 4 shows a high level flowchart for detecting source code base bias for an artificial intelligence system, according to an embodiment of the present invention.

FIG. 4 is an operational flow chart showing high-level operations of the techniques provided herein for detection of potential source code bias in an AI/ML, system. At operation 710, a plurality of users contributing to content of the source code base are identified. At operation 720, a plurality of user contributions are generated by determining each user contribution to the source code base by analyzing attributes of the content. At operation 730, the plurality of user contributions are mapped to respective profiles of the users. At operation 740, the system determines whether categories of contribution defined for the source code base are met, based upon the mapping of the plurality of user contributions to respective profiles.

Embodiments of the present invention provide an improvement in detecting bias in AWL systems and applications. Bias may be injected into AI/ML systems and applications unintentionally due to the composition of its development, testing, production and validation team. These embodiments provide techniques to adapt a source code development environment to detect unintentional bias. These approaches are fully customizable to any AI/ML, application, and may be performed iteratively during the product development cycle.

These techniques may be applied to a wide variety of environments, including hiring analysis tools, document analysis, device/product development, etc. Present techniques may be used in combination with other techniques that analyze AWL systems for bias.

Present techniques may also be used to prepopulate a team of users based on a product's targeted user group. For example, using machine learning and software evolution involving tooling, applications, and other code sources, future evolution of a source code base may be predicted with regards to having a potential bias. Early indicators may be identified prior to initial software development, allowing remediation to occur early in the developmental cycle.

In other aspects, the system may crowd source the evolution process of the software algorithms in order to detect and remove bias prior to the AI/ML system receiving approval for release into a production environment.

It will be appreciated that the embodiments described above and illustrated in the drawings represent only a few of the many ways of implementing embodiments for detecting source code base bias based upon user metrics and profiles.

The environment of the present invention embodiments may include any number of computer or other processing systems (e.g., client or end-user systems, server systems, etc.) and databases or other repositories arranged in any desired fashion, wherein the present invention embodiments may be applied to any desired type of computing environment (e.g., cloud computing, client-server, network computing, mainframe, stand-alone systems, etc.). The computer or other processing system employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, AI source code base bias detection system 15, etc.). These systems may include any type of monitors and input devices (e.g., keyboard, mouse, voice recognition, etc.) to enter and/or view information.

It is to be understood that the software (e.g., AI source code base bias detection system 15, including profile module 62, source code bias determination module 63, source code development environment 64, source code bias customization criteria module 66, source code bias analysis module 68, source code bias display module 72, source code bias remediation module 74, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., AI source code base bias detection system 15, including profile module 62, source code bias determination module 63, source code development environment 64, source code bias customization criteria module 66, source code bias analysis module 68, source code bias display module 72, source code bias remediation module 74, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., profiles, categories of contribution, user metrics, mapping of information to users and to categories of contribution, etc.). The database system may be implemented by any number of any conventional or other databases, data stores or storage structures (e.g., files, databases, data structures, data or other repositories, etc.) to store information (e.g., profiles, categories of contribution, user metrics, mapping of information to users and to categories of contribution, etc.). The database system may be included within or coupled to the server and/or client systems. The database systems and/or storage structures may be remote from or local to the computer or other processing systems, and may store any desired data (e.g., profiles, categories of contribution, user metrics, mapping of profile information to users and to categories of contribution, etc.).

The present invention embodiments may employ any number of any type of user interface (e.g., Graphical User Interface (GUI), command-line, prompt, etc.) for obtaining or providing information (e.g., profiles, categories of contribution, user metrics, mapping of profile information to users and to categories of contribution, etc.), wherein the interface may include any information arranged in any fashion. The interface may include any number of any types of input or actuation mechanisms (e.g., buttons, icons, fields, boxes, links, etc.) disposed at any location to enter/display information and initiate desired actions via any suitable input devices (e.g., mouse, keyboard, etc.). The interface screens may include any suitable actuators (e.g., links, tabs, etc.) to navigate between the screens in any fashion.

The output of the AI source code base bias detection system 15 may include any information arranged in any fashion, and may be configurable based on rules or other criteria to provide desired information to a user (e.g., profiles, categories of contribution, user metrics, mapping of profile information to users and to categories of contribution, etc.).

The present invention embodiments are not limited to the specific tasks or algorithms described above, but may be utilized for any application in which a plurality of users are developing a product and for which the product is to be analyzed for implicit bias. Further, this approach may be generally applicable to analyzing bias in any team environment, and is not limited to any particular application domain, such as artificial intelligence/machine learning, product/device development, documentation/research/analysis, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying potential bias in a source code base comprising:
    identifying, via a processor, a plurality of users contributing to content of the source code base;
    generating, via the processor, a plurality of user contributions by determining an amount of source code each user contributes to the source code base by analyzing attributes of the content;
    mapping, via the processor, the plurality of user contributions to respective profiles of the users;
    determining, via the processor, that categories of contribution defined for the source code base are not met, based upon the mapping of the plurality of user contributions to respective profiles, wherein the categories of contribution include percentages of the source code base contributed by a plurality of different groups of users; and
    automatically modifying the source code base, via the processor, to balance amounts of source code in the source code base contributed by the plurality of different groups of users to satisfy the percentages for the different groups of users and recompiling the modified source code base for release.

2. The method of claim 1, wherein user contribution is determined by direct contribution and indirect contribution.

3. The method of claim 2, wherein the direct contribution is based on an amount of source code added or edited by a user and the indirect contribution is based on an amount of source code validated by the user.

4. The method of claim 3, wherein the direct contribution is further based on one or more of a number of functions provided by the user, a number of modules provided by the user, a number of test cases written by the user, a number of test cases performed by the user, and a number of source code commits performed by the user.

5. The method of claim 1, wherein a profile of a user includes demographic information.

6. The method of claim 1, wherein the categories of contribution define requirements pertaining to the source code base including user contributions in view of user profiles and/or project roles.

7. The method of claim 1, further comprising:
    performing, when one or more categories of contribution are not met, one or more actions selected from a group consisting of alerting users of potential bias and delaying the release pending evaluation and remediation of the potential bias.

8. The method of claim 1, wherein the content of the source code base corresponds to an artificial intelligence (AI) and/or machine learning (ML) model.

9. A system to identify potential bias in a source code base, the system comprising:
    one or more computer processors;
    one or more computer readable storage media;
    program instructions stored on the one or more computer readable storage media for execution by at least one of the one or more computer processors, the program instructions comprising instructions to:
    identify a plurality of users contributing to content of the source code base;
    generate a plurality of user contributions by determining an amount of source code each user contributes to the source code base by analyzing attributes of the content;
    map the plurality of user contributions to respective profiles of the users;
    determine that categories of contribution defined for the source code base are not met, based upon the mapping of the plurality of user contributions to respective profiles, wherein the categories of contribution include percentages of the source code base contributed by a plurality of different groups of users; and
    automatically modify the source code base to balance amounts of source code in the source code base contributed by the plurality of different groups of users to satisfy the percentages for the different groups of users and recompile the modified source code base for release.

10. The system of claim 9, wherein user contribution is determined by direct contribution and indirect contribution, and wherein the direct contribution is based on an amount of source code added or edited by a user and the indirect contribution is based on an amount of source code validated by the user.

11. The system of claim 10, wherein the direct contribution is further based on one or more of a number of functions provided by the user, a number of modules provided by the user, and a number of source code commits performed by the user.

12. The system of claim 9, wherein a profile of a user includes demographic information.

13. The system of claim 9, wherein the categories of contribution define requirements pertaining to the source code base including user contributions in view of user profiles and/or project roles.

14. The system of claim 9, wherein the program instructions further comprise instructions to:

perform, when one or more categories of contribution are not met, one or more actions selected from a group consisting of alerting users of potential bias and delaying the release pending evaluation and remediation of the potential bias.

15. A computer program product to identify potential bias in a source code base, the computer program product comprising one or more computer readable storage media collectively having program instructions embodied therewith, the program instructions executable by a computer to cause the computer to:

identify a plurality of users contributing to content of the source code base;

generate a plurality of user contributions by determining an amount of source code each user contributes to the source code base by analyzing attributes of the content;

map the plurality of user contributions to respective profiles of the users;

determine that categories of contribution defined for the source code base are not met, based upon the mapping of the plurality of user contributions to respective profiles, wherein the categories of contribution include percentages of the source code base contributed by a plurality of different groups of users; and automatically modify the source code base to balance amounts of source code in the source code base contributed by the plurality of different groups of users to satisfy the percentages for the different groups of users and recompile the modified source code base for release.

16. The computer program product of claim 15, wherein user contribution is determined by direct contribution and indirect contribution, and wherein the direct contribution is based on an amount of source code added or edited by a user and the indirect contribution is based on an amount of source code validated by the user.

17. The computer program product of claim 16, wherein the direct contribution is further based on one or more of a number of functions provided by the user, a number of modules provided by the user, and a number of source code commits performed by the user.

18. The computer program product of claim 15, wherein a profile of a user includes demographic information.

19. The computer program product of claim 15, wherein the categories of contribution define requirements pertaining to the source code base including user contributions in view of user profiles and/or project roles.

20. The computer program product of claim 15, wherein the program instructions further comprise instructions to:

perform, when one or more categories of contribution are not met, one or more actions selected from a group consisting of alerting users of potential bias and delaying the release pending evaluation and remediation of the potential bias.

\* \* \* \* \*